(12) United States Patent
Dietzsch et al.

(10) Patent No.: US 8,982,456 B2
(45) Date of Patent: Mar. 17, 2015

(54) INVERTED MICROSCOPE

(75) Inventors: Leander Dietzsch, Jena (DE); Matthias Gonschor, Gleichen (DE); Peter Schnuell, Gleichen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 287 days.

(21) Appl. No.: 13/634,967

(22) PCT Filed: Feb. 25, 2011

(86) PCT No.: PCT/EP2011/000932
§ 371 (c)(1),
(2), (4) Date: Sep. 14, 2012

(87) PCT Pub. No.: WO2011/124301
PCT Pub. Date: Oct. 13, 2011

(65) Prior Publication Data
US 2013/0003171 A1    Jan. 3, 2013

(30) Foreign Application Priority Data
Apr. 10, 2010  (DE) .......................... 10 2010 014 501

(51) Int. Cl.
*G02B 21/24* (2006.01)
*G02B 21/00* (2006.01)

(52) U.S. Cl.
CPC ............ *G02B 21/0088* (2013.01); *G02B 21/24* (2013.01)
USPC .......................................... 359/381; 359/384

(58) Field of Classification Search
USPC ................................. 359/381, 384
See application file for complete search history.

(56) References Cited

U.S. PATENT DOCUMENTS

| 7,035,002 B2 * | 4/2006 | Dietzsch et al. ............... 359/368 |
| 2003/0107800 A1 * | 6/2003 | Doering et al. ............... 359/388 |
| 2004/0004758 A1 * | 1/2004 | Dietzsch et al. ............... 359/368 |
| 2004/0027683 A1 | 2/2004 | Dietzsch et al. |
| 2005/0099679 A1 * | 5/2005 | Kleinteich et al. ............ 359/368 |
| 2006/0012858 A1 | 1/2006 | Bender |
| 2006/0012860 A1 | 1/2006 | Bender |

FOREIGN PATENT DOCUMENTS

| DE | 44 04 286 A1 | 8/1995 |
| DE | 296 04 667 U1 | 10/1996 |
| DE | 100 50 677 A1 | 4/2002 |
| DE | 10 2004 034 887 A1 | 2/2006 |
| DE | 10 2004 034 845 B4 | 5/2006 |
| DE | 10 2005 023 850 A1 | 11/2006 |
| DE | 10 2008 007 772 A1 | 8/2009 |
| EP | 1 666 947 A2 | 6/2006 |

* cited by examiner

*Primary Examiner* — Frank Font
(74) *Attorney, Agent, or Firm* — Patterson Thuente Pedersen, P.A.

(57) ABSTRACT

The invention relates to an inverted microscope, including a microscope stand having a stand housing. The stand housing has a rear wall, a front wall, and side walls, and an objective turret, a focusing drive, and a rotatable retaining device, which is designed as a reflector turret and which has a plurality of locations for receiving exchangeable optical components.
The retaining device protrudes from a side wall of the stand housing so that the optical components can be quickly changed without having to remove the retaining device from the stand housing.

9 Claims, 4 Drawing Sheets

INVERTED MICROSCOPE

PRIORITY CLAIM

The present application is a National Phase entry of PCT Application No. PCT/EP2011/000932, filed Feb. 25, 2010, which claims priority from German Application No 102010014501.7, filed Apr. 10, 2010, the disclosures of which are hereby incorporated by reference herein in their entirety.

FIELD OF THE INVENTION

The invention relates to an inverted microscope, comprising a microscope stand having a stand housing, composed of a rear wall, a front wall and side walls, and an objective turret, a focusing drive, and a rotatable retaining device, which is designed as a reflector turret and which has a plurality of locations for receiving exchangeable optical components.

BACKGROUND

In inverted microscopes, focusing drive, reflector unit, and objective turret are arranged one above the other.

The reflector unit can be designed as a turret or a slider and can usually be removed for changing components. With more than three optical components (reflector modules), one turret variety is usually chosen. The diameter of the turret is determined by the number of reflector modules it can accommodate. At a certain number, the diameter of the turret or the parts required for operation exceeds the width of the stand, so it must be arranged entirely above the focusing drive knobs in order to avoid a collision.

The known microscopes with inverted design have change mechanisms for optical components in the area between objective and tube lens which can be designed as turret or slider, e.g., for the projection of the reflected-light beam path. They can be exchangeable or stationary.

In addition, optical components such as magnification changers (Optovars) and contrast elements (analyzers), etc., can be housed in these turrets or sliders instead of these projections.

Generally, the turrets in these inverted microscopes are, similar to the optical axis, centrally arranged in the microscope and have a vertical turret axis of rotation.

In DE 102004034887, an inverted microscope having a holding apparatus, insertable reversibly into the microscope for interchangeable optical components is described. The holding apparatus is embodied as a pivoting drawer that is arranged pivotably in and out about a pivot axis. During exchange or insertion of optical components, the pivoting drawer always remains connected to the microscope stand even in the pivoted-out state.

SUMMARY OF THE INVENTION

The solutions in the prior art are fundamentally disadvantageous because the arrangement of a change mechanism is contingent upon a relatively tall design height of the microscope. This is particularly undesirable for small inverted microscopes used primarily for routine operations because a low stage height is a very important ergonomic criterion. Operating effortlessly on the microscope stage while simultaneously resting the arm on the work table is not always ensured.

The height of the microscope stage is therefore set at a minimum when using a reflector turret as a change mechanism for optical components and an ergonomic drive height. This is predetermined by the necessary arrangement of the drive knobs (distance between eyepiece and drive knob) in the area of the reflector turret with inverted stands. In order to avoid collision with the drive knobs, the reflector turret must be arranged above them. Reflector sliders are also conceivable but they have substantial disadvantages due to the limited number of positions, e.g., for the use with many different fluorescence applications.

Moreover, the solutions of the prior art are disadvantageous because the turret design and the slider design have to be at least partially removed from the microscope stand when changing components of the change mechanism.

Therefore, the invention addresses the problem of further developing the design of an inverted microscope such that the disadvantages of the prior art are largely eliminated, allowing for a simpler and quicker changing of optical components for various applications.

This problem is solved, according to the invention, with an inverted microscope of the initially described type wherein an axis of rotation of the retaining device is arranged parallel to an optical axis of the microscope with the axis or rotation having a displacement (Vx) from the optical axis in the direction toward a first one of the side walls of the stand housing and a displacement (Vy) from the optical axis in the direction toward the front wall of the stand housing, wherein the retaining device protrudes from the first one of the side walls by a distance (Ax) through an opening, and the receiving locations are located in the retaining device such that optical components can be pivoted into the optical axis of the microscope by rotating the retaining device.

According to the invention, the axis of rotation of the retaining device runs parallel to the optical axis with a displacement in the direction of a side wall of the stand housing, wherein the retaining device protrudes from said side wall of the stand housing.

It is advantageous for the retaining device to protrude from a side wall because it does not have to be removed from the stand housing when components are changed, allowing thus for a simpler and quicker change of components.

The locations for receiving optical components are introduced in the retaining device such that they can be pivoted into the optical axis of the microscope by rotating the retaining device.

In an example embodiment, the retaining device has four locations for receiving optical components, wherein it is also conceivable to increase or decrease said number.

Depending on the use of the microscope, the rotation of the retaining device can be performed manually or with the use of a motorized drive, e.g., a tooth belt drive.

It is advantageous, for example, to arrange the motorized drive unit in the installation space of the stand housing, which is facing away from the lateral displacement of the axis of rotation of the retaining device in the direction of one side wall of the stand housing, because said displacement provides for sufficient space in this area.

Advantageously, the focusing drive, having a coarse and a fine focus, is arranged below the retaining device in the side walls of the stand housing at a height ergonomic for the operator, wherein the drive knob for the coarse and fine focus is expediently located in the side wall of the stand housing which is facing away from the lateral displacement of the axis of rotation of the retaining device.

A drive knob with a smaller diameter, e.g., which only affects the fine focus, can be arranged on the side of the stand housing with the protruding retaining device.

It is also conceivable that the smaller drive knob for fine focusing can be omitted.

Due to the arrangement of the retaining device for optical components designed as reflector turret in conjunction with the arrangement of the focusing drive, the retaining device and the object stage can structurally be lowered greatly. Free access to the drive knobs for the coarse and fine focus is assured despite the lowered retaining device.

In a further possible embodiment, the lowering of the object stage can be foregone, using only the simple change option of the optical components resulting from the lateral displacement.

BRIEF DESCRIPTION OF THE DRAWINGS

In the following, the inverted microscope, according to the invention, is further described in terms of two embodiments.

DETAILED DESCRIPTION

Figure 1:
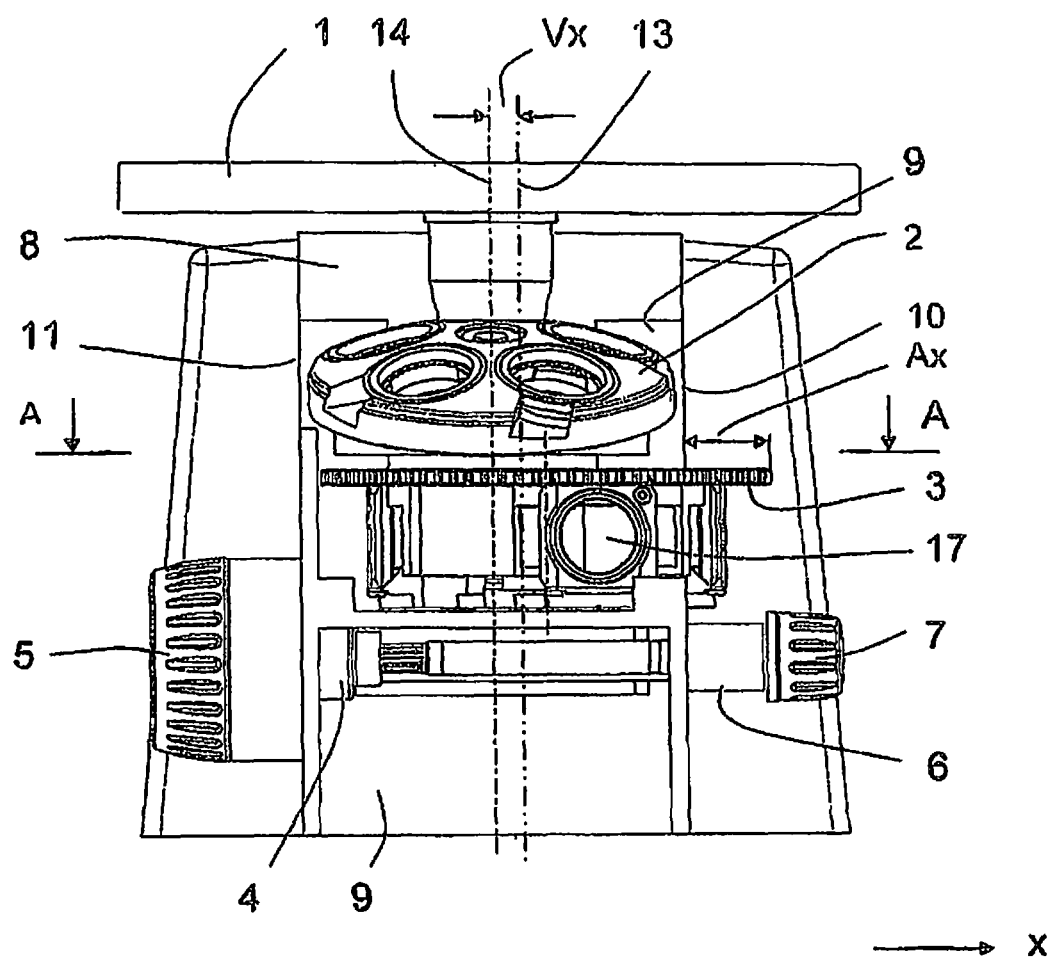
FIG. 1 depicts a schematic depiction of the inverted microscope as seen from the operator.
Figure 2:
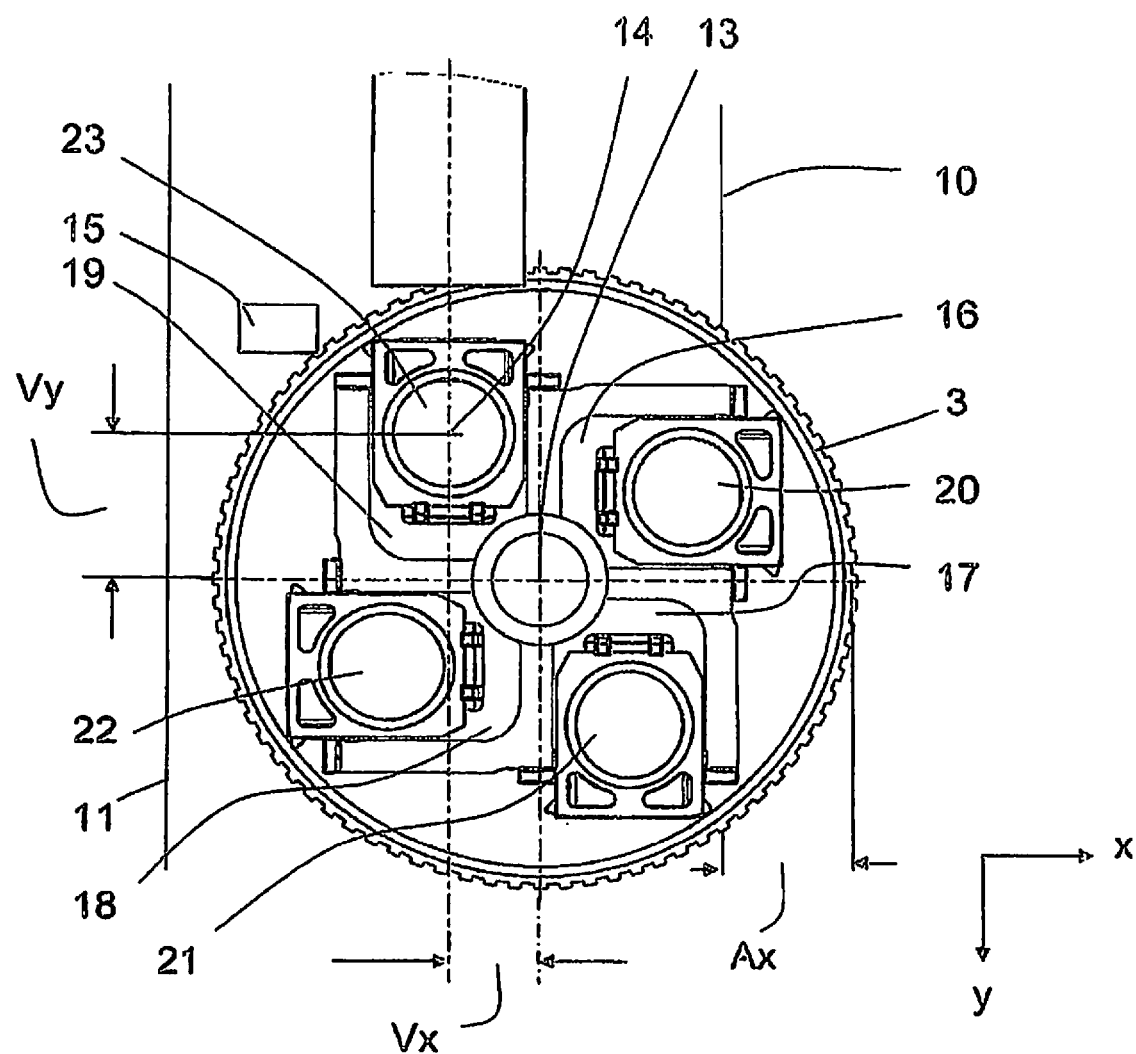
FIG. 2 depicts a cross-sectional view A-A according to FIG. 1.
Figure 3:
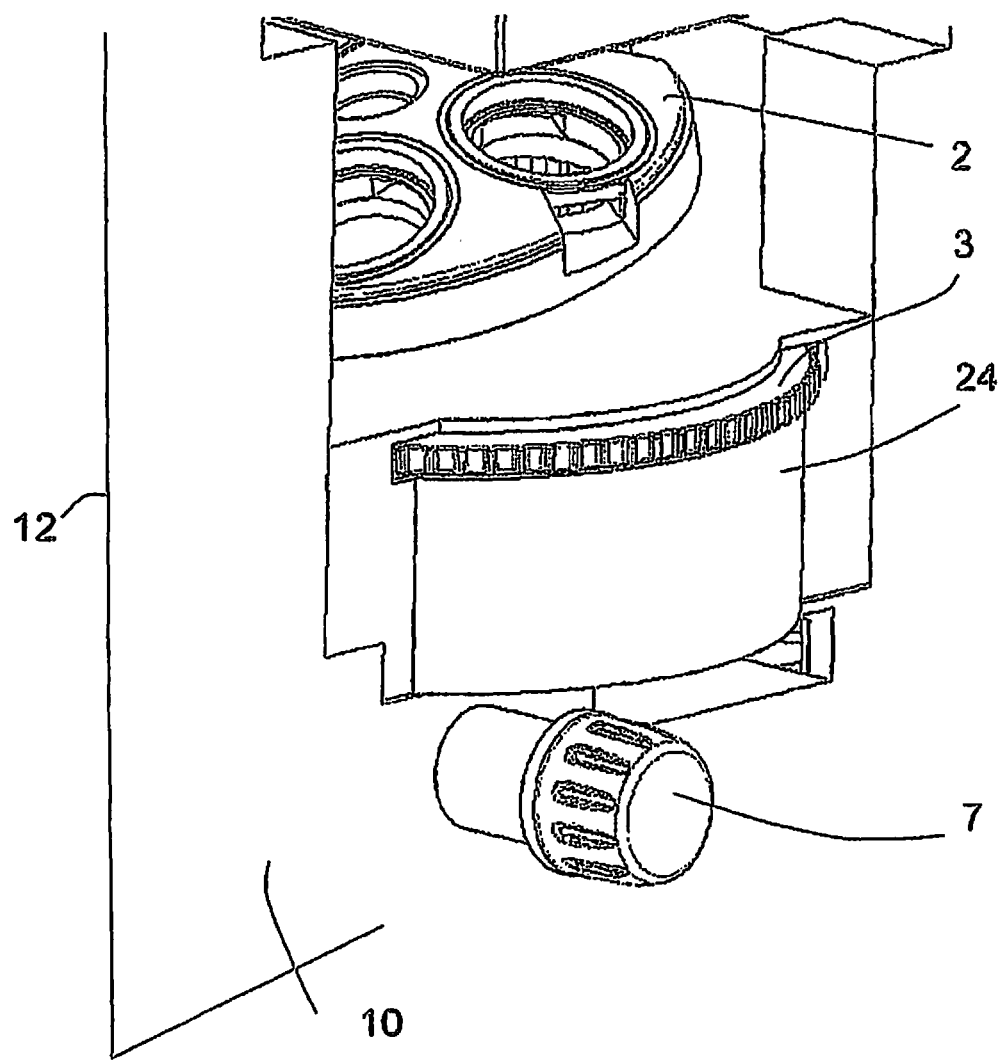
FIG. 3 depicts a perspective partial depiction of the microscope.

In a first embodiment, FIG. 1 shows the inverted microscope, according to the invention, with an object stage 1, an objective turret 2, a retaining device 3 designed as a reflector turret for exchangeable optical components (FIG. 2), and a focusing drive including a coarse focus 4 with drive knob 5 and a fine focus 6 with drive knob 7, which are attached to a microscope stand 8 or to a stand housing with a rear wall 9, a left and a right side wall 10 and 11 and a front wall 12 (FIG. 3).

The retaining device 3 is arranged on the microscope stand 8 such that its axis of rotation 13 runs parallel to the optical axis 14 of the microscope with a displacement Vx in the direction of the side wall 10 of the stand housing and a displacement Vy (FIG. 2) in the direction of the front wall 12 (FIG. 3) of the stand housing.

For the purpose of rotating the retaining device 3, it is coupled with a motorized drive unit 15 (only schematically depicted), which is arranged in the installation space of the stand housing (FIG. 2).

The retaining device 3 has four receiving locations 16, 17, 18, and 19 (FIG. 2), wherein FIG. 1 only shows receiving location 17.

Figure 4:
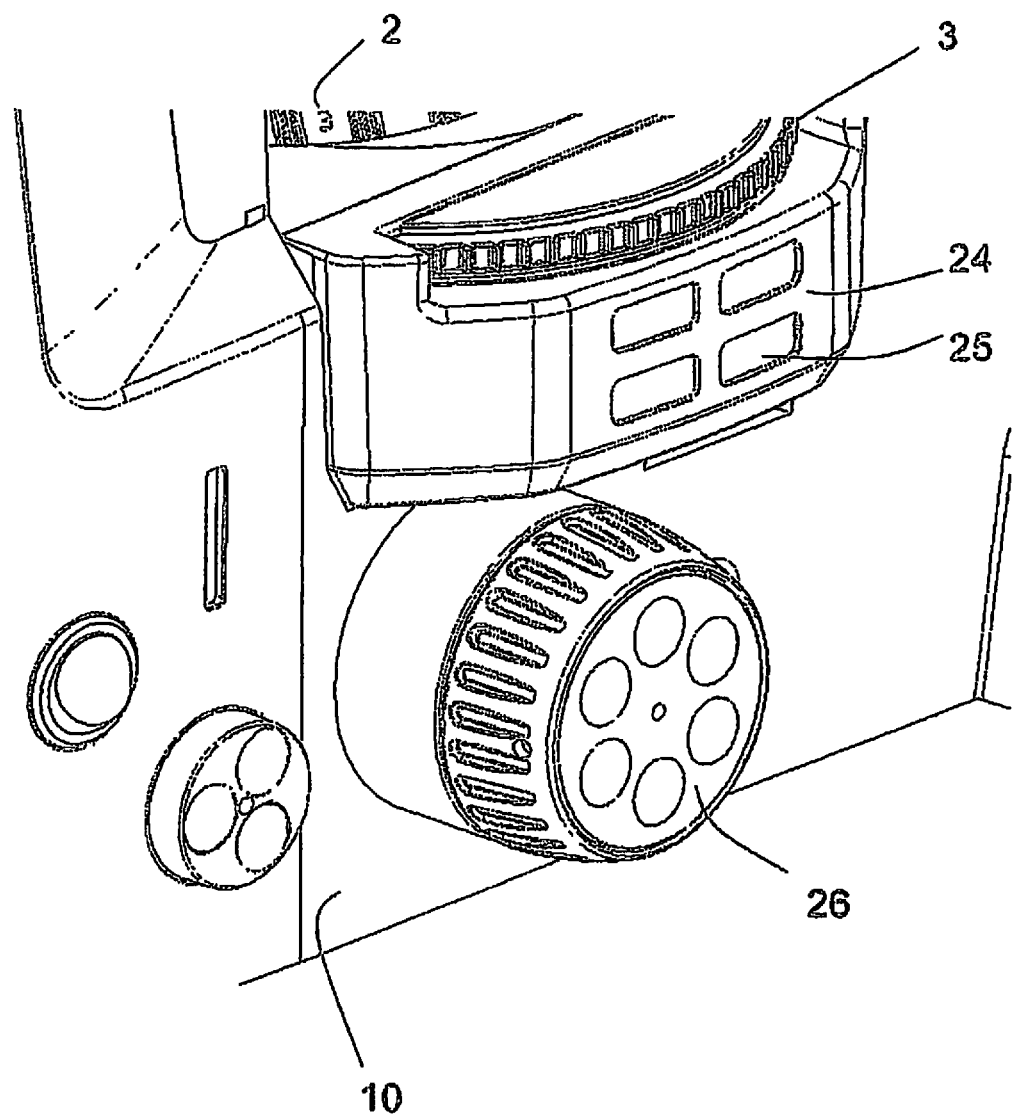
FIG. 4 depicts a further perspective partial depiction of the microscope without the lowering of the object stage.

For the purpose of placing the optical components 20, 21, 22, and 23 in the retaining device 3, it protrudes from the side wall 10 of the stand housing by a distance Ax. The side wall 10 has an opening, which according to FIGS. 3 and 4, is covered with a removable cover flap 24.

FIG. 2 shows the cross-sectional view A-A denoted in FIG. 1 with the receiving locations 16, 17, 18, and 19 for the optical components 20, 21, 22, and 23.

The receiving locations 16, 17, 18, and 19 are introduced in the retaining device 3 such that they can be pivoted into the optical axis of the microscope through its rotation.

FIG. 3 schematically shows the retaining device 3 protruding from the side wall 10 in its closed state. For the purpose of attaching the optical components 20, 21, 22, and 23 to the retaining device 3, the cover flap 24 is removed. FIG. 3 also shows the arrangement of the fine focus 6 with the drive knob 7.

In a second embodiment, FIG. 4 also shows schematically the retaining device 3 protruding from the side wall 10 in its closed state, wherein the cover flap 24 has four receiving surfaces 25 for denoting the optical components 20, 21, 22, and 23. Since the lowering of the object stage is foregone in this embodiment, the microscope has a further drive knob 26 in addition to the coarse and fine focus 4 with the drive knob 5 as shown in FIGS. 1 and 2. The fine focus 6 with the drive knob 7, according to FIGS. 1 and 2, can be omitted.

LIST OF REFERENCE SIGNS

1 Object stage
2 Objective turret
3 Retaining device (reflector turret)
4 Coarse focus
5, 7, 26 Drive knob
6 Fine focus
8 Microscope stand
9 Rear wall
10, 11 Side wall
12 Front wall
13 Axis of rotation
14 Optical axis
16, 17, 18, 19 Motorized drive unit
16, 17, 18, 19 Receiving location
20, 21, 22, 23 Optical component
24 Cover flap
25 Receiving surface
Vx, Vy Displacement
Ax Distance

The invention claimed is:

1. An inverted microscope, comprising:
   a microscope stand having a stand housing, including a rear wall, a front wall and side walls;
   an objective turret;
   a focusing drive;
   a rotatable retaining device, which is designed as a reflector turret and which has a plurality of locations for receiving exchangeable optical components therein;
   wherein an axis of rotation of the rotatable retaining device is arranged parallel to an optical axis of the microscope with the axis of rotation having a displacement (Vx) from the optical axis in the direction toward a first one of the side walls of the stand housing and a displacement (Vy) from the optical axis in the direction toward the front wall of the stand housing, wherein the rotatable retaining device protrudes from the first one of the side walls by a distance (Ax) through an opening, and the receiving locations are located in the retaining device such that optical components can be pivoted into the optical axis of the microscope by rotating the retaining device.

2. The inverted microscope according to claim 1, further comprising a motorized drive unit operably coupled to the retaining device that rotates the retaining device.

3. The inverted microscope according to claim 2, wherein the motorized drive unit is arranged in an installation space of the stand housing which is opposite from the lateral displacement (Vx) of the axis of rotation of the retaining device.

4. The inverted microscope according to claim 1, wherein the retaining device has four receiving locations for optical components.

5. The inverted microscope according to claim 1, further comprising a removable or collapsible cover flap and wherein the opening of the side wall of the stand housing from which the retaining device protrudes can be covered with the removable or collapsible cover flap.

6. The inverted microscope according to claim 1, wherein the focusing drive further comprises a coarse focus and a fine focus and the fine focus is arranged below the retaining device in at least one of the side walls of the stand housing.

7. The inverted microscope according to claim 6, wherein a drive knob for the coarse focus and the fine focus is arranged in the side wall of the stand housing which is opposite from the lateral displacement (Vx) of the axis of rotation of the retaining device.

8. The inverted microscope according to claim 7, wherein the drive knob for the fine focus is arranged in the side wall from which the retaining device protrudes from the stand housing.

9. The inverted microscope according to claim 7, wherein the coarse focus and the fine focus with the drive knob has an additional drive knob which is arranged in the side wall from which the retaining device protrudes from the stand housing.

\* \* \* \* \*